United States Patent Office 3,518,256
Patented June 30, 1970

3,518,256
2 - [2 - (5 - NITRO - 2 - FURYL)VINYL]PYRIDINE DERIVATIVES AND PROCESS FOR PREPARATION THEREOF
Shinsaku Minami, Yamatokooriyama-shi, Minoru Nakata, Amagasaki-shi, Katsuro Fujimoto, Osaka-fu, and Yoshiyuki Takase, Amagasaki-shi, Japan, assignors to Dainippon Pharmaceutical Co., Ltd., Higashi-ku, Japan
No Drawing. Filed July 19, 1965, Ser. No. 473,166
Claims priority, application Japan, July 24, 1964, 39/42,189; Nov. 25, 1964, 39/66,338; Jan. 6, 1965, 40/526
Int. Cl. C07d 31/28
U.S. Cl. 260—240      6 Claims

ABSTRACT OF THE DISCLOSURE

A compound of the formula:

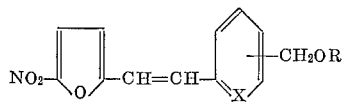

wherein X represents a member selected from the group consisting of N and N→O, the radical —CH$_2$OR is at 5- or 6-position of the pyridine ring, and R represents a member selected from the group consisting of hydrogen and lower alkanoyl. Such compounds have anti-bacterial activity.

---

It is found that 2-[2-(5-nitro-2-furyl)vinyl]-5- or 6-hydroxymethyl, or -alkanoyloxymethylpyridines and N-oxides thereof represented by the general formula:

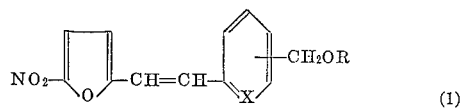
(1)

have excellent antimicrobial activities. In the above Formula 1, X represents a member selected from the group consisting of N and N→O, the radical —CH$_2$OR is at 5- or 6-position of the pyridine ring, and R represents a member selected from the group consisting of hydrogen and lower alkanoyl such as acetyl and propionyl.

Examples of 2-[2-(5-nitro-2-furyl)vinyl] pyridines and N-oxides thereof represented by the above Formula 1 include 2 - [2-(5-nitro-2-furyl)vinyl]-6-hydroxymethylpyridine N-oxide, -6-acetoxymethylpyridine N-oxide, -6-hydroxymethylpyridine, -6-acetoxymethylpyridine, -6-propionyloxymethylpyridine, -5-hydroxymethylpyridine N-oxide, -5-acetoxymethylpyridine N-oxide, -5-hydroxymethylpyridine, -5-acetoxymethylpyridine, and the like. Among those, the compounds having hydroxymethyl or alkanoyloxymethyl at 6-position of the pyridine ring, particularly the first named three compounds in the above, are preferred.

According to this invention, the compounds of the above Formula 1 can be prepared by the process comprising condensing 5-nitrofurfural with a compound of the formula

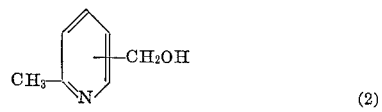
(2)

in which X and R having the above-defined signification, or reacting 2-[2-(5-nitro-2-furyl)vinyl]-6-methylpyridine N-oxide with a lower fatty acid anhydride and, if desired, hydrolyzing and/or oxidizing the resultant reaction product.

The condensation of 5-nitrofurfural with the compound of the above Formula 2 can be performed in the manner which is known per se. This condensation can be advantageously performed by heating the reactants to an elevated temperature such as 70° C. in the presence of a lower fatty acid anhydride such as acetic anhydride and propionic anhydride, optionally in an inert solvent. In case the compound of the Formula 2 in which R is H is used as the starting material, the acid anhydride functions as an alkanoylating agent as well as a condensing agent. For condensation of 5-nitrofurfural with the compound of the Formula 2 in which X is N, other condensing agent such as hydrochloric acid, sulfuric acid, melted zinc chloride and anhydrous sodium acetate may be suitably used. Those condensing agents other than the acid anhydrides do not function as alkanoylating agent.

In accordance with one feature of this invention, the product having the substituted methyl group at 6-position of the pyridine ring may also be prepared by the reaction of 2-[2-(5-nitro-2-furyl)vinyl]-6-methylpyridine N-oxide with a lower fatty acid anhydride such as acetic anhydride and propionic anhydride. Such a reaction can be explained by the following chemical formulae, in which acetic anhydride is used for an illustration.

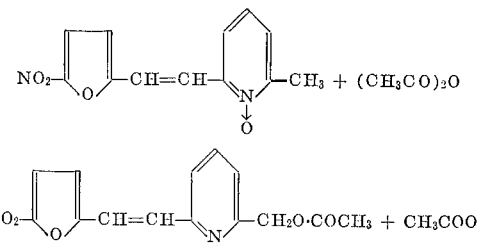

This rearrangement reaction can be performed by heating the reactants in an inert solvent such as acetic acid and toluene. Whereas, it can also be performed with advantage by heating the N-oxide with an excess of acid anhydride to a temperature of, say, at lowest 90° C. The starting material, i.e., 2-[2-(5-nitro-2-furyl)vinyl]-6-methylpyridine N-oxide can be readily prepared by oxidation with hydrogen peroxide in glacial acetic acid of 2-[2-(5-nitro-2-furyl)vinyl]-6 - methylpyridine (Belgian Pat. No. 613,604) or condensation of 5-nitrofurfural with 2,6-dimethylpyridine N-oxide.

The above condensation or rearrangement reaction product can be converted to the corresponding hydroxymethyl compound or N-oxide compound by hydrolysis and/or oxidation known per se, if so desired. For hydrolyzing lower alkanoyloxymethyl compound into corresponding hydroxymethyl compound, such known acidic hydrolyzing agent such as sulfuric acid, phosphoric acid, hydrogen halide and organic acids can be advantageously used. Although basic hydrolyzing agents such as caustic soda and sodium carbonate are also effective, the use thereof does not result in good yield of the product. This hydrolysis can be performed in an inert solvent such as alcohol and dioxane. It can be accelerated by heating.

The pyridine compounds of the Formula 1 in which X is N can be oxidized to the corresponding N-oxide compounds by the means known per se. This oxidation can be performed, for example, oxidizing the pyridine compound at room temperature or at an elevated temperature, with a known, suitable oxidizing agent such as hydrogen peroxide and organic peroxides. While such an oxidation may be performed in an inert solvent such as water and alcohol, it is found that the preferred practice is to perform the oxidation in glacial acetic acid with hydrogen peroxide.

EXAMPLE 1

A mixture consisting of 1.4 g. 5-nitrofurfural, 1.7 g. 2-methyl-5-acetoxymethylpyridine and 3.1 g. acetic anhydride was heated to 120–130° C. for 4.5 hours on an oil bath. From the reaction mixture, acetic anhydride was distilled off under reduced pressure, and to the residue was added an aqueous solution of sodium bicarbonate. Precipitation of crystal resulted, which was subsequently separated by filtration, washed with water, and recrystallized from ethanol. 1.2 grams of 2-[2-(5-nitro-2-furyl) vinyl]-5-acetoxymethylpyridine (compound No. 1) having a melting point of 127–128° C. was obtained.

EXAMPLE 2

The above Example 1 was repeated except that 2-methyl-5-acetoxymethylpyridine was replaced by the same quantity of 2-methyl-6-acetoxymethylpyridine, and that the crystalline product was recrystallized from acetone. One gram of corresponding 6-acetoxymethylpyridine (compound No. 2) having a melting point of 120–121° C. was obtained.

EXAMPLE 3

One hundred milligrams of 2 - [2-(5-nitro-2-furyl) vinyl]-6-methylpyridine N-oxide and 5 ml. of acetic anhydride were reacted at 100–110° C. for an hour under moisture-preventing condition. Then the acetic anhydride was distilled off under reduced pressure. To the residue was added water and the mixture was then ice-cooled. Precipitation of crystal resulted, which was recrystallized from ethanol to yield 70 mg. of 2-[2-(5-nitro-2-furyl) vinyl]-6-acetoxymethylpyridine (M.P. 120°–121° C.).

EXAMPLE 4

A mixture consisting of 2.8 g. 5-nitrofurfural, 2.5 g. 2, 6-dimethylpyridine N-oxide and 7.8 g. propionic anhydride was reacted for 4 hours at 70° C. The reaction mixture was further heated to 110–120° C. for additional 2 hours while the so formed 2-[2-(5-nitro-2-furyl)vinyl]-6-methylpyridine N-oxide was left therein. The excess of propionic anhydride was distilled off under reduced pressure, and the residue was hot-extracted with 20 ml. of methanol. After treating the extract with decolorizing carbon followed by cooling, the resultant crystalline precipitate was recrystallized from methanol. 1.5 grams of 2-[2-(5 - nitro - 2 - furyl)vinyl]-6-propionyloxypyridine (compound No. 3) having a melting point of 107–108° C. was obtained.

EXAMPLE 5

0.5 gram of 2 - [2 - 5 - nitro - 2 - furyl)vinyl]-5-acetoxy methylpyridine and 10 ml. of 15% sulfuric acid were reacted for 4 hours at 140° C. Then the reaction mixture was made alkaline with the addition of sodium bicarbonate aqueous solution and the resultant crystalline precipitate was separated by filtration, washed with water and recrystallized from methanol. 0.4 gram of 2-[2-(5-nitro-2-furyl) vinyl]-5-hydroxymethylpyridine (compound No. 4) having a melting point of 150–151° C. was obtained.

EXAMPLE 6

0.5 gram of 2 - [2 - (5 - nitro-2-furyl)vinyl]-6-acetoxymethylpyridine and 10 ml. of 15% sulfuric acid were reacted for 6 hours at 140° C. After the subsequent series of procedures same to those of Example 5 except that the recrystallization was performed from acetone, 0.3 g. of 2-[2 - (5 - nitro-2-furyl)vinyl] - 6 - hydroxymethylpyridine (compound No. 5) having a melting point of 170–171° C. was obtained.

EXAMPLE 7

Two grams of 2 - [2 - (5-nitro-2-furyl)vinyl]-6-methylpyridine N-oxide was reacted with 2.5 ml. of acetic anhydride for an hour at 120° C. Thereafter the acetic anhydride was distilled off under reduced pressure, and the residue was hot-extracted with 10 ml. of 10% hydrochloric acid. The extract was made alkaline with sodium bicarbonate aqueous solution, and the resultant crystalline precipitate was filtered and recrystallized from acetone. 1.1 grams of 2-[2-(5-nitro - 2 - furyl) vinyl] - 6-hydroxymethylpyridine (M.P. 170–171° C.) was obtained.

EXAMPLE 8

A mixture consisting of 5 g. 2 - [2 - (5 - nitro-2-furyl) vinyl]-5-acetoxymethylpyridine, 60 ml. acetic acid, and 6 ml. 30% aqueous hydrogen peroxide was reacted for 6 hours on a water bath at 70° C. Then the acetic acid was distilled off under reduced pressure, and to the residue was added water, followed by neutralization with sodium bicarbonate. Thus precipitated crystals were filtered, washed with water, dried and recrystallized from ethanol. Two grams of yellow needles of 2-[2-(5-nitro-2-furyl) vinyl]-5-acetoxymethylpyridine N-oxide (compound No. 6) having a melting point of 178–179° C. was obtained.

EXAMPLE 9

A mixture consisting of 1.4 g. 5-nitrofurfural, 1.8 g. 2-methyl-5-acetoxypyridine N-oxide and 3.1 g. acetic anhydride was reacted for 15 hours on a water bath at 70° C. Then the acetic anhydride was distilled off under reduced pressure, and the residue was ice-cooled. The crystals precipitated were recrystallized from ethanol to yield 0.65 g. of 2 - [2-(5-nitro-2-furyl)vinyl]-5-acetoxypyridine N-oxide having a melting point of 178–179° C.

EXAMPLE 10

A mixture consisting of 9 g. 2 - [2-(5 - nitro-2-furyl) vinyl]-6-acetoxymethylpyridine, 110 ml. acetic acid and 12 ml. 30% aqueous hydrogen peroxide was reacted for 20 hours on a water bath at 60° C. After the subsequent series of procedures same to those in Example 8 except that the crystals obtained were recrystallized from acetone, 4.5 g. of yellow needles of 2-[2-(5-nitro-2-furyl) vinyl]-6-acetoxymethylpyridine N-oxide (compound No. 7) having a melting point of 195–197° C. was obtained.

EXAMPLE 11

A mixture consisting of 1.4 g. 5-nitrofurfural, 1.4 g. 2-methyl-6-hydroxymethylpyridine N-oxide and 3.1 g. acetic anhydride was reacted for 17.5 hours on a water bath at 70° C. Then the acetic anhydride was distilled off under reduced pressure, and the remaining reaction mixture was ice-cooled to be crystallized. The crystals were washed with 5 ml. ether, and were recrystallized from acetone to yield 0.6 g. of 2-[2-(5-nitro-2-furyl) vinyl]-6-acetoxymethylpyridine N-oxide having a melting point of 195–197° C.

EXAMPLE 12

A mixture consisting of 0.1 g. 2-[2-(5-nitro-2-furyl) vinyl]-5-hydroxymethylpyridine, 5 ml. acetic acid and 0.2 ml. 30% aqueous hydrogen peroxide was reacted for 5.5 hours on a water bath at 70° C. Then the acetic acid was distilled off under reduced pressure. The residue was added with water and neutralized with sodium bicarbonate, and the crystal precipitated therein as the result was filtered, washed with water, dried and recrystallized from acetone. 0.065 gram of orange needles of 2-[2-(5-nitro-2-furyl) vinyl]-5-hydroxymethylpyridine N - oxide (compound No. 8) having a melting point of 210–211° C. (decomposed) was obtained.

EXAMPLE 13

0.3 gram of 2-[2-(5-nitro-2-furyl) vinyl]-5-acetoxymethylpyridine N-oxide and 15 ml. of 10% hydrochloric acid were reacted for an hour on a steam bath. After cooling, the reaction mixture was controlled of its pH to 8 with sodium bicarbonate, and the crystals thereby precipitated were filtered, washed with water and crystallized from acetone, to yield 0.2 g. of orange needles of 2-[2-(5-nitro-2-furyl) vinyl]-5-hydroxymethylpyridine N-oxide having a melting point of 210– 211° C. (decomposed).

EXAMPLE 14

A mixture consisting of 2.4 g. 2-[2-(5-nitro-2-furyl) vinyl]-6-hydroxymethylpyridine, 5 ml. acetic acid and 5 ml. 30% aqueous hydrogen peroxide was reacted for 7 hours on a water bath at 70° C. As the consequence of the following treatments similar to those in Example 12, 1.6 g. of yellow needles of 2-[2-(5-nitro-2-furyl) vinyl]-6-hydroxymethylpridine N-oxide (compound No. 9) having a melting point of 210–211° C. (decomposed) was obtained.

EXAMPLE 15

Twenty milligrams of 2-[2-(-nitro-2-furyl) vinyl]-6-acetoxymethylpyridine N-oxide and 2 ml. of 10% hydrochloric acid were reacted for 0.5 hour on a steam bath at 100° C. After cooling the reaction mixture was adjusted its pH to 8 with sodium bicarbonate aqueous solution, and the crystals thereby precipitated were filtered, washed with water and recrystallized from acetate, to yield 10 mg. of 2-[2-(5-nitro-2-furyl) vinyl]-6-hydroxymethylpyridine N-oxide having a melting point of 210°–211° C. (decomposed).

The new compounds of this invention have high in vitro activities against gram positive bacteria such as *Stayphylococcus ureus, Staphyloccus albus* and *Streptococcus haemolytics*; Gram negative bacteria such as *Escherichia coli, Salmonella enteritidis* and *Shigella flexneri*; *Mycobacterium tuberculosis*; fungi such as *Candida albicans, Crytococcus neoformans, Trichophyton asteroides* and *Microsporum gypseum*; and protozoa such as *Trichomonas vaginalis*.

The in vivo activities of the novel compounds of this invention against *Salmonella typhimurium* are shown in the following Table I. In the following tables, compounds Nos. 1 through 9 are the compounds as identified in the foregoing examples of this invention, and the compounds Nos. 10 through 12 are controls as identified below.

Compound No. 10:
    2-[2-(5-nitro-2-furyl) vinyl] pyridine
Compound No. 11:
    2-[2-(5-nitro-2-furyl) vinyl]-6-methylpyridine
Compound No. 12:
    2-[2-(5-nitro-2-furyl) vinyl] pyridine N-oxide ministration. The average plasma levels (mcg./ml.) in six rats are given in the following Table II.

TABLE II.—PLASMA LEVEL

| Compound | Time after administration | | | | |
|---|---|---|---|---|---|
| | 1 hr. | 2 hrs. | 3 hrs. | 6 hrs. | 24 hrs. |
| No. 7 | 1.1 | 0.8 | 0.8 | 0.3 | <0.3 |
| No. 9 | 4.0 | 2.5 | 1.1 | 0.2 | <0.2 |
| No. 12 | <0.3 | <0.3 | <0.3 | <0.3 | <0.3 |

Heretofore, no nitrofuran derivatives on the market which reach to exert active plasma level have been found. Whereas, as is clear from Table II, the preferred compounds of this invention show considerable plasma level in their active form.

Acute toxicity in mice of some of the compounds of this invention and that of the control compounds are shown in Table III below.

TABLE III.—ACUTE TOXICITY IN MICE
($LD_{50}$: mg./kg.)

| Compound: | I.p. | P.o. |
|---|---|---|
| No. 1 | 707 | 933 |
| No. 2 | >2,000 | >2,000 |
| No. 5 | >2,000 | >2,000 |
| No. 6 | 1,150 | 1,620 |
| No. 7 | 1,410 | 2,000 |
| No. 9 | 707 | 1,310 |
| No. 10 | 1,275 | >2,000 |
| No. 11 | >1,000 | >1,000 |
| No. 12 | 900 | 900 |

What is claimed is:
1. A compound of the formula:

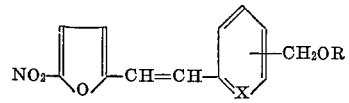

wherein X represents a member selected from the group consisting of N and N→O, the radical —$CH_2OR$ is at 5- or 6-position of the pyridine ring, and R represents a member selected from the group consisting of hydrogen and lower alkanoyl.

TABLE I.—THERAPEUTIC EFFECT IN MALE MICE
(a) Per Os treatment (survived/tested) Infection: ip

| Dose,[1] mg./kg. | Compound | | | | | | | | | |
|---|---|---|---|---|---|---|---|---|---|---|
| | No. 1 | No. 2 | No. 4 | No. 5 | No. 6 | No. 7 | No. 8 | No. 9 | No. 10 | No. 11 |
| 100 | 10/10 | 6/10 | 10/10 | 7/10 | | | | | 1/10 | |
| 50 | 7/10 | 3/10 | 9/10 | 2/10 | 10/10 | 10/10 | | 10/10 | 0/10 | 3/10 |
| 25 | 5/10 | 1/10 | 5/10 | 0/10 | 4/10 | 6/10 | | 10/10 | | |
| 12.5 | 3/10 | 0/10 | 1/10 | | 2/10 | 3/10 | | 8/10 | | |
| 6.3 | 1/10 | | 0/10 | | 0/10 | 0/10 | 5/10 | 2/10 | | |
| 3.1 | 0/10 | | | | | | | 0/10 | | |
| Non-treated control | (0/10) | | | | | | | | | |
| $ED_{50}$ | 23.3 | ≑70.7 | 25.0 | ≑75.8 | 23.3 | 18.9 | | 8.8 | >100 | |

(b) Intraperitoneal treatment (survived/tested)

| Dose,[1] mg./kg. | Compound | | | | | | | | |
|---|---|---|---|---|---|---|---|---|---|
| | No. 1 | No. 2 | No. 4 | No. 5 | No. 6 | No. 7 | No. 9 | No. 10 | No. 11 |
| 100 | | | | | | | | [2] 6/10 | |
| 50 | | 10/10 | | | | | | 9/10 | 10/10 |
| 25 | 10/10 | 10/10 | 10/10 | 10/10 | | | | 7/10 | |
| 12.5 | 9/10 | 8/10 | 8/10 | 7/10 | 10/10 | 10/10 | | 6/10 | |
| 6.3 | 8/10 | 2/10 | 5/10 | 5/10 | 9/10 | 9/10 | 10/10 | 1/10 | |
| 3.1 | 2/10 | 1/10 | 3/10 | 2/10 | 8/10 | 5/10 | 10/10 | 0/10 | |
| 1.6 | 0/10 | 0/10 | 1/10 | 1/10 | 5/10 | 3/10 | 5/10 | | |
| 0.8 | | | 0/10 | 0/10 | 2/10 | 1/10 | 0/10 | | |
| 0.4 | | | | | 0/10 | 0/10 | 0/10 | | |
| Non-treated control | (0/10) | | | | | | | | |
| $ED_{50}$ | 4.7 | 8.3 | 5.4 | 6.3 | 1.7 | 2.5 | 1.6 | >12.5 | |

[1] 2 times per day for 4 days.
[2] Death by toxicity.

Plasma levels of some active compounds were measured by microbioassay, cup-plate method using *Bacillus substilis*. In the tests, 100 mg./kg. of each of the active compounds was administered to male rat weighing 300–400 g. The plasma levels of the compounds in the rats were measured one, two, three, six and twenty four hours after oral ad- 2. A compound of the formula:

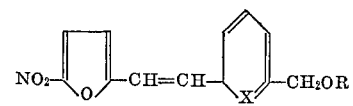

wherein X represents a member selected from the group consisting of N and N→O, and R represents a member selected from the group consisting of hydrogen and lower alkanoyl.

3. 2 - [2-(5-nitro-2-furyl)vinyl]-6-hydroxymethylpyridine N-oxide.

4. 2 - [2 - (5-nitro-2-furyl)vinyl]-6-acetoxymethylpyridine N-oxide.

5. 2 - [2 - (5-nitro-2-furyl)vinyl]-6-hydroxymethylpyridine.

6. The compound of claim 1, wherein R is selected from hydrogen and acetyloxy.

References Cited

UNITED STATES PATENTS

| | | | |
|---|---|---|---|
| 3,352,683 | 11/1967 | Schmidt et al. | 260—240 |
| 3,414,567 | 12/1968 | Minami et al. | 260—240 |

FOREIGN PATENTS

| | | |
|---|---|---|
| 252,804 | 6/1964 | Australia. |
| 673,311 | 10/1963 | Canada. |

OTHER REFERENCES

Klingsberg, "Pyridine and Derivatives," Part II, pp. 125 to 127, Interscience Publishers, Inc. N.Y. (1961).

JOHN D. RANDOLPH, Primary Examiner

U.S. Cl. X.R.

424—263; 260—297, 295